United States Patent
DeJong et al.

(10) Patent No.: US 9,321,251 B2
(45) Date of Patent: Apr. 26, 2016

(54) METHOD AND CONSTRUCTIONS FOR MOISTURE SENSITIVE LAYERS AND STRUCTURES HAVING REDUCED MOISTURE CONTENT IN MOISTURE SENSITIVE LAYERS

(75) Inventors: Samuel J. DeJong, Hudsonville, MI (US); Michael D. Broekhuis, Wyoming, MI (US); Harlan J. Byker, West Olive, MI (US)

(73) Assignee: PLEOTINT, L.L.C., West Olive, MI (US)

( * ) Notice: Subject to any disclaimer, the term of this patent is extended or adjusted under 35 U.S.C. 154(b) by 538 days.

(21) Appl. No.: 12/816,635

(22) Filed: Jun. 16, 2010

(65) Prior Publication Data
US 2010/0316846 A1    Dec. 16, 2010

Related U.S. Application Data

(60) Provisional application No. 61/187,448, filed on Jun. 16, 2009.

(51) Int. Cl.
| | |
|---|---|
| *B32B 3/10* | (2006.01) |
| *B32B 33/00* | (2006.01) |
| *B32B 17/10* | (2006.01) |
| *B32B 27/30* | (2006.01) |
| *B32B 3/26* | (2006.01) |
| *B32B 7/06* | (2006.01) |
| *B32B 9/00* | (2006.01) |
| *B65D 81/26* | (2006.01) |

(52) U.S. Cl.
CPC ............... *B32B 33/00* (2013.01); *B32B 3/263* (2013.01); *B32B 7/06* (2013.01); *B32B 9/005* (2013.01); *B32B 17/10761* (2013.01); *B32B 27/30* (2013.01); *B65D 81/264* (2013.01); *B32B 2250/42* (2013.01); *B32B 2307/726* (2013.01); *Y10T 428/1352* (2015.01); *Y10T 428/24355* (2015.01); *Y10T 428/24612* (2015.01); *Y10T 428/249991* (2015.04); *Y10T 428/269* (2015.01); *Y10T 428/31909* (2015.04); *Y10T 428/31942* (2015.04)

(58) Field of Classification Search
CPC .......... B32B 7/06; B32B 3/263; B32B 9/005; B32B 27/30; B32B 33/00; B32B 2250/42; B32B 2307/726; B32B 17/10761

USPC .................. 428/156, 172, 515, 906
See application file for complete search history.

(56) References Cited

U.S. PATENT DOCUMENTS

| | | | |
|---|---|---|---|
| 4,104,555 A * | 8/1978 | Fleming ........................ | 313/512 |
| 4,919,984 A * | 4/1990 | Maruhashi et al. .......... | 428/36.4 |
| 5,536,347 A | 7/1996 | Moran | |
| 6,365,284 B1 | 4/2002 | Liposcak | |
| 6,493,960 B2 * | 12/2002 | Taylor et al. ...................... | 34/80 |
| 6,777,100 B2 * | 8/2004 | Sumita et al. .................. | 428/481 |
| 7,220,815 B2 | 5/2007 | Hayes | |
| 7,525,717 B2 | 4/2009 | Byker et al. | |
| 7,538,931 B2 | 5/2009 | Byker et al. | |
| 7,542,196 B2 | 6/2009 | Byker et al. | |
| 7,704,342 B2 | 4/2010 | Bourcier et al. | |
| 2003/0235664 A1 | 12/2003 | Merical et al. | |
| 2004/0131805 A1 | 7/2004 | Merical et al. | |
| 2006/0087230 A1 | 4/2006 | Ghosh et al. | |
| 2006/0269708 A1 | 11/2006 | Merical et al. | |
| 2007/0160789 A1 | 7/2007 | Merical et al. | |
| 2008/0012172 A1 | 1/2008 | Merical et al. | |
| 2008/0105851 A1 | 5/2008 | Byker et al. | |
| 2008/0106781 A1 | 5/2008 | Byker et al. | |
| 2008/0160321 A1 | 7/2008 | Padiyath et al. | |
| 2008/0185301 A1 | 8/2008 | Merical et al. | |
| 2009/0283728 A1 | 11/2009 | Byker et al. | |

FOREIGN PATENT DOCUMENTS

JP    2009-123690    6/2009

OTHER PUBLICATIONS

Machine translation of JP 2009-123690, Jun. 2009.*
PCT, International Search Report and Written Opinion, International Application No. PCT/US2010/038784 (Aug. 11, 2010).
European Application No. 10790103.5, European Search Report and Opinion, Jul. 5, 2013.
JP Application No. 2012-516232, Notification of Reasons for Rejection (Jan. 28, 2014).
Keller, U. et al., "Adhesion in Laminated Safety Glass—What makes it work?", Glass Processing Days, Jun. 13-16, 1999.
"PVB Sheet Moisture," web page of MoistTech Corp., http://www.moisttech.com/pvb-sheet-moisture/ (first publication at least as early as Dec. 2012).

* cited by examiner

*Primary Examiner* — Donald J Loney
(74) *Attorney, Agent, or Firm* — Thompson Hine LLP

(57) ABSTRACT

Alternating layers of a first moisture sensitive layer are formed with a second desiccant containing layer. The desiccant containing layer removes moisture from the first moisture sensitive layer and maintains the first layer in a relatively dry condition.

22 Claims, No Drawings

METHOD AND CONSTRUCTIONS FOR MOISTURE SENSITIVE LAYERS AND STRUCTURES HAVING REDUCED MOISTURE CONTENT IN MOISTURE SENSITIVE LAYERS

CROSS REFERENCE TO RELATED APPLICATION

This application claims the benefit of U.S. Provisional Application Ser. No. 61/187,448 filed Jun. 16, 2009, the entire contents of which are hereby incorporated by reference.

BACKGROUND

This disclosure relates to an improvement in moisture sensitive layers and in particular to polyvinyl butyral (PVB) film or sheet products and more particularly to an improvement in the thermochromic PVB products described in the following commonly owned U.S. patents and applications: U.S. Pat. No. 7,538,931; U.S. Patent Publication No. 2008/0105851; U.S. Pat. No. 7,525,717; and U.S. Pat. No. 7,542,196, all to Byker et al. and all of which are incorporated herein by reference. As described in the '717 patent, thermochromic PVB products have a thermochromic layer that includes a polymer, at least one transition metal ion, at least one high epsilon ligand capable of forming a high epsilon metal-ligand complex with the transition metal ion and at least one low epsilon ligand capable of forming an low epsilon metal-ligand complex with the transition metal ion. PVB is a copolymer sometimes designated as poly(vinyl butyral-co-vinyl alcohol-co-vinyl acetate). PVB is widely used in making safety glass laminates for motor vehicle windshields and architectural safety glass.

Various film and layers including PVB films have a strong propensity to absorb water. It is a common practice when manufacturing these films or sheets to maintain low relative humidity in the manufacturing environment and carefully package the rolls of film or sheet in moisture resistant packaging. Some of the thermochromic PVB films or sheets disclosed by Byker et al. are even more hygroscopic and more sensitive to absorbed moisture and hence it is not uncommon to store rolls of thermochromic PVB films or sheets under vacuum in the presence of desiccant. Moisture in the PVB films or sheets disclosed by Byker et al. is undesirable because it can decrease the performance of the thermochromic system in the films and the moisture can lead to deleterious reactions that decrease durability of the films.

SUMMARY

In accordance with this disclosure, moisture sensitive layers including PVB films or sheets in general and PVB film or sheet products such as the thermochromic film products mentioned above are assembled or juxtaposed with a desiccant-containing film similar to those films and/or layers described in U.S. Patent Publication Nos. 2008/0185301, 2008/0012172, 2007/0160789, 2006/0269708, 2004/0131805, and 2003/0235664 to Merical, which are incorporated hereby by reference. It has been found that this construction reduces and/or maintains the amount of moisture in the films at low levels that in many instances enables the films to be laminated more easily with a reduced tendency to trap moisture in the films or sheets when they are laminated between sheets of glass.

In accordance with one manifestation of this disclosure, PVB films are assembled with a desiccant-containing film. In a further manifestation of the invention, the desiccant-containing film is removed prior to lamination of the PVB film. In a further manifestation of the invention, the thermochromic films described in the Byker et al. published applications are assembled with a desiccant-containing film. In a still further modification, the desiccant-containing film is removed from the thermochromic film prior to its lamination.

In accordance with another manifestation of this disclosure, the thermochromic film described above are supplied by interleaving the thermochromic films with a desiccant-containing film and the desiccant-containing film is removed prior to laminating the thermochromic film to a panel of glass or between sheets of glass as described in the aforementioned Published Applications to Byker et al.

In accordance with another manifestation of this disclosure, the invention is a stack or roll of alternating layers of a moisture sensitive film or sheet and desiccant loaded, moisture absorbing film or sheet.

In accordance with another manifestation of this disclosure, the invention is a stack or roll of alternating layers of a first polymeric material and a second polymeric material including or comprising a moisture absorbing desiccant.

In accordance with another manifestation of this disclosure, the invention is a stack or roll of alternating layers of a first polymeric material and a second polymeric material including or comprising a desiccant.

In another manifestation of the invention the desiccant-containing film is a polyethylene film having calcium oxide particles dispersed therein, and still more particularly, polyethylene film having calcium oxide particles dispersed therein in the amounts and in the manner described in the aforementioned Published Applications to Merical. In one embodiment the polyethylene film having calcium oxide particles dispersed therein is overcoated on one or both sides with moisture permeable low density polyethylene which does not contain desiccant. This bilayer or trilayer construction of the interleaving film allows for moisture uptake by the desiccant-containing layer while minimizing or preventing contact between the desiccant and the moisture sensitive layers including PVB film or sheet.

In one embodiment, a thermochromic film could be juxtaposed with a desiccant containing film, wound into a roll, stored and shipped, and then unrolled, separated from the desiccant-containing film, and used by the end user as otherwise described in the Byker et al. publications.

In still another embodiment, a plurality of thermochromic films could be interleaved with a plurality of desiccant-containing films. The end user would then remove the desiccant containing films and use the thermochromic film by, for example, laminating it between sheets of glass appropriate for the end user's application.

While this disclosure specifically addresses PVB films, the teachings herein may also be applicable to other films that are similar to PVB in terms of their water absorbing character and sensitivity to the presence of moisture. Other moisture sensitive films or sheets that form a first layer in an interleaved roll include fabrics, various types of paper, ethylene vinyl acetate, nylons and polyethylene terephthalate. Of particular interest is polyethylene terephthalate which has a tendency to expand with moisture. Dimensionally stabilized polyethylene terephthalate is very important for die cutting and circuit board fabrication.

Layers and polymers beside polyethylene that can be used for a desiccant loaded second layer for interleaving include polypropylene, nylons, polyethylene terephthalate, PVB and ethylene vinyl acetate. Desiccating materials other that calcium oxide that may be loaded into the desiccating layer include magnesium oxide, calcium sulfate, magnesium sulfate, silica, alumina and molecular sieves.

DETAILED DESCRIPTION

The following study was conducted to demonstrate proof of concept.

Procedure: Two thermochromic PVB films, one called blue type and one called orange type, were each cut into two pieces. One piece of each type that will be called "dry" was retained in a vacuum desiccator, and one of each type that was exposed to the relative humidity will be called "wet." The dry film of both the orange and blue film was cut into five pieces. The wet film of both the orange and blue film was cut into four pieces.

Dry Film of Both the Orange and Blue Film

A. Cut A was left exposed to the ambient relative humidity, and was tested every 24 hours for moisture content.
B. Cut B was left in the desiccator with a vacuum, and was tested every 24 hours for moisture content.
C. Cut C was placed in a desiccating pouch labeled 24 hours, and was tested for moisture content every 24 hours.
D. Cut D was placed in a desiccating pouch labeled 48 hours, and was tested for moisture content after 48 hours of the pouch being sealed. The pouch was resealed, and the film was tested for moisture content every 24 hours after the initial 48 hours.
E. Cut E was placed in a desiccating pouch labeled 72 hours, and was tested for moisture content after 72 hours of the pouch being sealed. The pouch was resealed, and the film was tested for moisture content every 24 hours after the initial 72 hours.

Wet Film of Both the Orange and Blue Film

F. Cut F was left exposed to the ambient relative humidity, and was tested every 24 hours for moisture content.
G. Cut G was placed in a desiccating pouch labeled 24 hours, and was tested for moisture content every 24 hours.
H. Cut H was placed in a desiccating pouch labeled 48 hours, and was tested for moisture content after 48 hours of the pouch being sealed. The pouch was resealed, and the film was tested for moisture content every 24 hours after the initial 48 hours.
I. Cut I was placed in a desiccating pouch labeled 72 hours, and was tested for moisture content after 72 hours of the pouch being sealed. The pouch was resealed, and the film was tested for moisture content every 24 hours after the initial 72 hours.

In order to measure the low moisture contents in PVB film, a Karl Fischer titration instrument was used. A sample of film in the Karl Fischer instrument is heated and the water i.e. moisture in the film is swept into a solution by a flow of dry nitrogen gas. The solution contains methanol, imidazole, sulfur dioxide, and iodide ion. In a coulometric Karl Fischer titration, iodine is generated electrolytically at the anode. An oxidation/reduction reaction then occurs when sulfur dioxide reacts with iodine and the water in the sample as shown by:

$$I_2 + SO_2 + H_2O \rightarrow 2HI + SO_3 \quad (1)$$

The iodine reacts with water in a one to one mole ratio, which allows for a direct relationship between the amount of electricity needed to create the iodine and the amount of water in the sample.

The pouches containing desiccant were made up of six layers. The first four, including an aluminum foil layer, are designed to keep moisture out of the pouch. Following these layers is a separator layer, which is followed by a peelable desiccant film that contains calcium oxide as the desiccating material. The calcium oxide reacts with the moisture in the air in the bag, as shown in equation (2), and lowers the relative humidity.

$$CaO + H_2O \rightarrow Ca(OH)_2 \quad (2)$$

Methods:

All Karl Fischer titration based moisture readings were performed using a Mitsubishi Moisture Meter, CA-06 with a VA-06 Vaporizer. The oven was set to 140° C., with a two minute purge, two minute heat up and two minute cool down before each sample. A 3000 µL capillary tube was used at an oven temperature of 150° C. to calibrate the moisture meter before and after all the film tests were run, and was allowed to have a 5% margin of error. A small sample was cut from each of the pieces of film. The sample weighed between 0.2 and 0.25 grams.

The desiccating pouches were sealed with a thermal sealer with rollers and set to about 160° C. The pouches were then cut open to measure the film, and then resealed having been open for approximately five minutes each time.

Results & Discussion:

In the analysis of the pouches, it is best to compare the control of the same color film. All the data for the blue film are in Table 1, and all the data for the orange film are in Table 2.

TABLE 1

Moisture percentage in the blue film using the Karl Fischer titration data. The indoor relative humidity, (RH), where the samples were stored and the outdoor RH are given on the days moisture measurements were made.

| Sample | Description | Indoor RH = 48% Outdoor RH = 87% 0 hours | RH = 45% RH = 67% c.a. 24 hours | RH = 50% RH = 72% c.a. 48 hours | RH = 49% RH = 78% c.a. 72 hours | RH = 46% RH = 60% c.a. 96 hours |
|---|---|---|---|---|---|---|
| A (Dry) | open to air | 0.33% | 1.72% | 1.744% | | |
| B (Dry) | desiccator | 0.33% | 0.16% | 0.12% | 0.22% | 0.20% |
| C (Dry) | 24 hour pouch | 0.33% | 0.22% | 0.23% | 0.22% | 0.21% |
| D (Dry) | 48 hour pouch | 0.33% | | 0.19% | 0.16% | 0.20% |
| E (Dry) | 72 hour pouch | 0.33% | | | 0.21% | 0.21% |
| F (Wet) | open to air | 1.79% | 1.95% | 1.78% | 1.91% | 1.97% |
| G (Wet) | 24 hour pouch | 1.79% | 1.50% | 1.31% | 0.83% | 0.71% |
| H (Wet) | 48 hour pouch | 1.79% | | 1.08% | 1.01% | 0.77% |
| I (Wet) | 72 hour pouch | 1.79% | | | 0.56% | 0.41% |

TABLE 2

Moisture percentage in the orange film using the Karl Fischer titration data.
The indoor relative humidity, (RH), where the samples were stored and
the outdoor RH are given on the days moisture measurements were made.

| Sample | Description | Indoor R = 48%<br>Outdoor RH = 87%<br>0 hours | RH = 45%<br>RH = 67%<br>c.a. 24 hours | RH = 50%<br>RH = 72%<br>c.a. 48 hours | RH = 9%<br>RH = 78%<br>c.a. 72 hours | RH = 6%<br>RH = 60%<br>c.a. 96 hours |
|---|---|---|---|---|---|---|
| A (Dry) | open to air | 0.19% | 1.27% | 1.30% | | |
| B (Dry) | desiccator | 0.19% | 0.13% | 0.10% | 0.20% | 0.14% |
| C (Dry) | 24 hour pouch | 0.19% | 0.16% | 0.17% | 0.20% | 0.19% |
| D (Dry) | 48 hour pouch | 0.19% | | 0.17% | 0.15% | 0.18% |
| E (Dry) | 72 hour pouch | 0.19% | | | 0.12% | 0.16% |
| F (Wet) | open to air | 1.37% | 1.34% | 1.21% | 1.33% | 1.34% |
| G (Wet) | 24 hour pouch | 1.37% | 0.98% | 0.61% | 0.39% | 0.30% |
| H (Wet) | 48 hour pouch | 1.37% | | 0.66% | 0.37% | 0.27% |
| I (Wet) | 72 hour pouch | 1.37% | | | 0.25% | 0.21% |

The wet blue film started with 1.8% moisture content, and rose to as much as about 2.0% in open air. The moisture content of the blue film that had been placed in the 24 hour desiccant pouch was reduced by about 0.3 percentage points. This continued to decline even when the pouch was opened for testing and then resealed. The wet blue film in the 48 hour pouch was able to decrease the moisture content down to 1.01% compared with 1.31% in the 24 hour pouch, suggesting that opening the pouch did affect its ability to remove moisture from the film, but did not ruin the pouch. The wet blue film in the 72 hour pouch did the best after 96 hours, by decreasing the moisture content of the film down to 0.41%, but all the pouches were able to decrease the moisture content below 0.8% after 96 hours as shown in Table 1.

The dry blue film started with 0.33% moisture content, and the vacuum desiccator was able to further dry the film during the experiment to 0.12%. As can be seen in Table 1, the moisture content of the blue film bounces around. This could possibly be due to the fluctuation in relative humidity, and the decreasing ability of the desiccant to do its job.

In comparison, the wet orange film in the pouches, which started with lower moisture content than the wet blue, were dried further than the blue. The wet orange film started with a moisture content of 1.37%, and after 96 hours, the 72 hour pouch had dried the film to 0.21% indicating the rate of drying to be about 0.30 percentage points per day. The drying ability of the pouches is almost a linear relationship, as can be seen in Table 2. It also appeared that opening the pouch did affect its ability to dry the film, but not as drastically as with the blue film.

The dry orange film was also dried further by the pouches. The dry orange films, starting at 0.19% were dried to 0.14% in the vacuum desiccator, and to an average of 0.18% in all three pouches. These values also varied as with the blue film.

In another experiment a moisture absorbing film was made up of a layer of low density polyethylene ("LDPE"), a layer of CaO loaded high density polyethylene ("HDPE") and a layer of LDPE. An interleaved roll was prepared with this material and a layer of PVB which contained 27 weight % tri(ethylene glycol) bis(2-ethylhexanoate) as plasticizer. Several extra wraps of the desiccant loaded film were rolled onto the outer surface of the interleaved roll. This roll was stored unpackaged and otherwise unprotected indoors in a normal shop environment. At various times during the storage, the roll was unrolled and samples of the PVB layer were taken from the locations within the roll indicated in Table 3 and analyzed for moisture content. The films were then re-rolled in the interleaved configuration and stored for additional time. The desiccating interleave kept the PVB layers from sticking to each other and thereby kept the roll from blocking. The results of moisture tests are shown in Table 3. It is remarkable that the desiccating interleave layer can remove moisture and extend the shelf life with regard to moisture content of the PVB even when the interleaved roll is stored unpackaged in an open shop environment.

TABLE 3

Weight Percent Moisture in PVB Film as determined by Karl Fischer
Titration for Interleaved Roll with Alternating Layers of the
Desiccating Layer and Plasticized PVB Layer.

| Hours | inner most film on core | ⅔ of the way in | ⅓ of the way in | outer most film |
|---|---|---|---|---|
| 0 | 0.60% | 0.58% | 0.56% | 0.61% |
| 24 | 0.55% | 0.52% | 0.47% | 0.46% |
| 168 | 0.37% | 0.43% | 0.38% | 0.32% |
| 336 | 0.29% | 0.28% | 0.28% | 0.30% |
| 672 | 0.11% | 0.13% | 0.09% | 0.37% |

Similar experiments have been conducted with rolls of thermochromic PVB. In these experiments the moisture content in the thermochromic PVB is decreased by storage with a desiccating interleave layer. Commercially available examples of desiccating CaO filled interleave layers are DM-8977 and DZ-3458 available from Alcan Packaging of Marshall, N.C. The preferred thicknesses of the desiccating interleave is 0.001 inches to 0.01 inches. In one embodiment, the thickness for the trilayer of LDPE-CaO loaded HDPE-LDPE is 0.0025 inches prior to any optional support. These co-extrude calcium oxide loaded polyethylene trilayers from Alcan were embossed by passage between a rubber nip roll and steel emboss roll with a female emboss pattern 0.012" to 0.013" deep. Embossing took place with emboss roll temperature of 95° C., a nip pressure of 150 pounds per linear inch and a line speed of 3 feet per minute.

In one embodiment, after a roll was formed with the moisture sensitive thermochromic PVB and the desiccating interleave, additional protection from moisture ingress into the PVB was provided by placing the interleaved roll in a metal foil lined bag and sealing the bag. Alternately, in another embodiment, the roll was protected by wrapping the roll with an external film. The external film was about 1 to 20 extra wraps of desiccating interleave that sacrificially prevents moisture from getting to the rest of the roll. Even when part of the roll is removed and the PVB is used to make laminates, a low moisture content can be maintained and shelf life extended for the rest of the roll by repackaging and subsequent storage with the remaining desiccating interleave. The thermochromic performance in the PVB was increased by the removal of moisture by the desiccating interleave. The longevity predicted by accelerated durability in a xenon arc light exposure chamber also increased. Also, the desiccating interleave kept the thermochromic PVB layers from sticking to each other and thereby kept the roll from blocking.

When PVB is used as an interlayer between two pieces of glass to make a sheet of laminated safety glass, it is preferred that the PVB have rough textured outer surfaces. The surface should be sufficiently roughly textured to allow air to be expelled from the glass/PVB/glass three layer stack when the stack is passed through a heated pinch roller to tack the film to the glass sheets and create an edge seal for later autoclave processing. The textured outer surface on the PVB can be induced by surface melt fracture or by embossing the PVB layer on one or both sides. It has been discovered that when PVB with a textured outer surface is interleaved with a desiccating layer with smooth surfaces the surface texture of the PVB is lost while setting on the interleaved roll. However it has also been discovered that when the desiccating layer is also textured it can be used as an interleaving layer for PVB with minimal negative impact on the PVB surface texture. In one embodiment, adequate texture can be provided on the desiccating layer by separately embossing the desiccating layer between a rubber nip roll and steel emboss roll. Preferred conditions are a emboss roll temperature of 95° C., a nip pressure 150 pounds per linear inch and a line speed of 3 feet per minute.

In one embodiment, a desiccating layer was made up of co-extruded layers of LDPE, a layer of CaO filled HDPE and a layer of LDPE. This trilayer had the appearance of a single film. In one instance, an interleave was prepared with this desiccant loaded film and a layer of PVB which contained 27 weight % tri(ethylene glycol) bis(2-ethylhexanoate) as plasticizer. After several weeks the roll with alternating layers of the desiccating layer and the plasticized PVB layer was unrolled and it was discovered that the desiccating layer had wrinkled, giving the layer a "worm eaten wood" appearance. The wrinkling of the desiccating layer transferred into the PVB layer and made it difficult to use the PVB to laminate together pieces of glass. The wrinkles caused optical distortion, void area and/or bubbles to appear in the laminate of two pieces of glass with this PVB interlayer. But, when this same desiccating layer is first bonded to a permeable support like a nonwoven fabric or mesh and then interleaved with PVB to make a roll of alternating layers of the desiccating layer and the plasticized PVB layer the wrinkling problem can be eliminated or significantly reduced. When such a roll was stored for a month and unrolled, it was essentially free of wrinkles and buckling in the PVB layer and the PVB layer was used to make laminates with two sheets of glass with the PVB as an interlayer. These laminates were free of optical distortion, void area and bubbles.

One example of nonwoven is a polyethylene nonwoven available under the trade name CLAF®, from Atlanta Nisseki CLAF, Incorporated. One or more than one layer of nonwoven can be used as a support for the desiccating interleave layer. The nonwoven not only provides support for the desiccating interleave to minimize wrinkling, it provides surface texture on the desiccating interleave that minimizes the loss of texture from the PVB that is interleaved with the desiccating film. The nonwoven also helps prevent sticking of the layers of film to each other.

In summary, one manifestation of the invention is a film construction comprising a layer of PVB and a layer of a desiccant-containing film.

Another manifestation of this disclosure is a stack or roll of alternating layers of a moisture sensitive film or sheet and desiccant loaded, moisture absorbing film or sheet.

Another manifestation of this disclosure is a stack or roll of alternating layers of a first polymeric material and a second polymeric material including a moisture absorbing desiccant.

Another manifestation of this disclosure is a stack or roll of alternating layers of a first polymeric material and a second polymeric material including a desiccant.

Another manifestation is the aforementioned construction packaged or wrapped in an external film that cooperates with the desiccant-containing film to provide a PVB film exhibiting reduced moisture content.

In another manifestation, a construction comprising a layer or sheet of PVB and the layer of the desiccant-containing film is wound into a roll.

In another manifestation, the desiccant-containing film is textured prior to being wound with PVB into a roll and helps preserve texture on the PVB it is interleaved with.

In another manifestation, the desiccant-containing film is supported by a nonwoven mesh prior to being wound into a roll with a film of PVB and minimizes wrinkle formation in the films during storage.

In a further manifestation, the layers of the film construction are arranged such that when wound into a roll, one or more wraps of the desiccant-containing film resides on the outer surface of the roll.

In a further manifestation of the invention, a method of providing a PVB film or construction having reduced moisture is provided which comprises providing a PVB film, and placing the PVB film between adjacent layers or windings of a desiccant-containing film.

A further manifestation of the invention is a thermochromic product having any of the constructions described in the Byker et al. publications wherein the thermochromic product is placed between adjacent films or windings of a desiccant-containing film.

In a more particular manifestation of the invention, the desiccant-containing film is a film including a polymer and a desiccant wherein the polymer and desiccant are any of the materials described in the Merical publications.

In a still more particular manifestation of the invention, the desiccant-containing film comprises polyethylene and calcium oxide particles.

In a still more specific manifestation of the invention, the desiccant-containing film is a polyethylene film having calcium oxide particles dispersed therein which is overcoated on one or both sides with a moisture-permeable low density polyethylene.

Having described the invention in detail and with reference to specific embodiments thereof, it will be apparent that numerous variations and modifications are possible without departing from the spirit and scope of the following claims.

Having described the invention in detail and by reference to specific embodiments thereof it will be apparent that numerous variations and modifications are possible without departing from the spirit and scope of the following claims.

What is claimed is:

1. A roll of alternating layers of films or sheets for storage and/or shipment of an interlayer film comprising:
   an interlayer film comprising PVB or ethylene vinyl acetate; and
   a desiccant-containing film juxtaposed with the interlayer film;
   wherein the juxtaposed interlayer film and the desiccant-containing film are wound into a roll of alternating layers wherein the interlayer film and the desiccant-containing film directly contact each other;

wherein the desiccant-containing film prevents the blocking of the interlayer film;

wherein the desiccant-containing film is capable of removing moisture from the interlayer film; and wherein the desiccant-containing film is readily removable from the interlayer film to recover the interlayer film.

2. The roll of claim 1 wherein the desiccant-containing film comprises one or more than one permeable support layer.

3. The roll of claim 1 wherein the interlayer film is a thermochromic PVB.

4. The roll of claim 1 wherein the roll is packaged or wrapped in an external film that cooperates with the desiccant-containing film or sheet to provide an interlayer film exhibiting reduced moisture.

5. The roll of claim 1 wherein the desiccant-containing film comprises polyethylene and calcium oxide particles.

6. The roll of claim 5 wherein the desiccant-containing film is a polyethylene film having calcium oxide particles dispersed therein which is overcoated on one or both sides with a moisture-permeable low density polyethylene.

7. The roll of claim 1 wherein the interlayer film and the desiccant-containing film are both textured.

8. The roll of claim 1 further comprising a sealed bag, wherein the bag contains the roll therein.

9. The roll of claim 8 wherein the bag comprises a foil lining.

10. The roll of claim 2 wherein the permeable support layer is a nonwoven mesh or fabric.

11. The roll of claim 5 wherein the polyethylene is high density polyethylene.

12. The roll of claim 1 wherein the moisture content of the interlayer film is below about 0.4%.

13. The roll of claim 1 wherein the desiccant-containing film is longer than the interlayer film, and wherein the roll further comprises one or more wraps of the desiccant-containing film on an outer surface of the roll.

14. The roll of claim 1 wherein the interlayer film comprises PVB.

15. A roll of alternating layers of films or sheets for storage and/or shipment of an interlayer film comprising:

an interlayer film comprising PVB or ethylene vinyl acetate; and a desiccant-containing film juxtaposed with the interlayer film;

wherein the juxtaposed interlayer film and the desiccant-containing film are wound into a roll of alternating layers wherein the interlayer film and the desiccant-containing film directly contact each other;

wherein the desiccant-containing film prevents the blocking of the interlayer film;

wherein the desiccant-containing film is capable of removing moisture from the interlayer film; and wherein the desiccant-containing film is not permanently bonded to the interlayer film.

16. The roll of claim 15 wherein the interlayer film is a thermochromic PVB.

17. The roll of claim 15, wherein the desiccant-containing film comprises a permeable support layer.

18. The roll of claim 17, wherein the permeable support layer is a nonwoven mesh or fabric.

19. The roll of claim 17, wherein the desiccant-containing film further comprises a tri-layer of calcium oxide-loaded high density polyethylene positioned between two layers of low density polyethylene, wherein the tri-layer is bonded to the permeable support layer.

20. The roll of claim 15, wherein the interlayer film and the desiccant-containing film are both textured.

21. The roll of claim 15, wherein the desiccant-containing film is longer than the interlayer film, and wherein the roll further comprises one or more wraps of the desiccant-containing film on an outer surface of the roll.

22. The roll of claim 15, wherein the moisture content of the interlayer film is below about 0.4%.

* * * * *